United States Patent
Ryu et al.

(10) Patent No.: US 8,139,163 B2
(45) Date of Patent: Mar. 20, 2012

(54) TELEVISION LINK INFRARED MODULATION CIRCUIT

(75) Inventors: Young Sik Ryu, Gyunggi-Do (KR); Chang Kap Nam, Gyunggi-Do (KR); Hyo Young Maeng, Gyunggi-Do (KR)

(73) Assignee: Samsung Electro-Mechanics Co. Ltd., Gyunggi-do (KR)

( * ) Notice: Subject to any disclaimer, the term of this patent is extended or adjusted under 35 U.S.C. 154(b) by 1280 days.

(21) Appl. No.: 11/779,102

(22) Filed: Jul. 17, 2007

(65) Prior Publication Data

US 2008/0024681 A1    Jan. 31, 2008

(30) Foreign Application Priority Data

Jul. 28, 2006   (KR) ................ 10-2006-0071589

(51) Int. Cl.
*H04N 5/44* (2011.01)
(52) U.S. Cl. ...................... 348/734; 348/726
(58) Field of Classification Search .......... 348/734, 348/726; 340/12.22, 12.23
See application file for complete search history.

(56) References Cited

U.S. PATENT DOCUMENTS 6,628,344 B1   9/2003   Weber

FOREIGN PATENT DOCUMENTS

| DE | 134588 A1 | 3/1979 |
| EP | 0666657 A1 | 8/1995 |
| GB | 1410774 | 10/1975 |
| JP | 08088546 A * | 4/1996 |

OTHER PUBLICATIONS

UK Intellectual Property Office International Search Report, mailed Nov. 27, 2007.

* cited by examiner

*Primary Examiner* — Michael Lee
(74) *Attorney, Agent, or Firm* — Lowe, Hauptman, Ham & Berner, LLP

(57) ABSTRACT

A television (TV) link infrared (IR) demodulation circuit including: a reference voltage setting unit setting a first reference voltage and a second reference voltage, different from each other; and a differential amplifier differentially amplifying the first reference voltage received via a first input terminal and a voltage obtained by coupling an input signal with the second reference voltage, via a second input terminal and demodulating a remote control signal received via the second input terminal into a pulse signal.

11 Claims, 6 Drawing Sheets

TELEVISION LINK INFRARED MODULATION CIRCUIT

CROSS-REFERENCE TO RELATED APPLICATIONS

This application claims the priority of Korean Patent Application No. 2006-0071589 filed on Jul. 28, 2006, in the Korean Intellectual Property Office, the disclosure of which is incorporated herein by reference.

BACKGROUND OF THE INVENTION

1. Field of the Invention

The present invention relates to a television (TV) link infrared (IR) demodulation circuit applied to a TV receiver such as set-top box, and more particularly, to a TV link infrared (IR) demodulation circuit in a set-top box connected to a plurality of TVs, the TV link IR demodulation circuit improving control sensitivity for remote-controlling TVs connected to one set-top box for each multi-room by more accurately detecting a weak signal from a TV link to remotely control a TV.

2. Description of the Related Art

In general, TV receivers such as set-top boxes receive and transmit a plurality of broadcasts such as terrestrial broadcasts and satellite broadcasts to a plurality of TV sets.

FIG. 1 is a functional diagram illustrating a conventional IR demodulation circuit 10 in a set-top box.

Referring to FIG. 1, the set-top box 10 receiving terrestrial broadcasts and satellite broadcasts includes a radio frequency (RF) modulator 11, a divider 12, an infrared (IR) demodulation circuit 13, and a main controller 14. A TV1 20 at a close range and a TV2 30 at a distant range may be connected via the divider 12.

In this case, for example, the TV1 20 at a close range is closely connected to the set-top box 10 installed in the same space such as a living room or a main room. In this case, the TV may be directly controlled by a remote control since the set-top box 10 processing remote control is adjacently located.

For example, the TV2 30 at a distant range is installed in a different space from the set-top box 10, such as a basement or an attic. The TV2 30 at a distant range is distantly connected to the set-top box 10. In this case, since the set-top box 10 processing remote control is located in a distant place in which remote control is difficult, an amplitude of a signal from the remote control is modulated into 7.2 MHz by a TV link 40 and transmitted to the set-top box 10 located in a distant range.

In this case, the remote control signal is demodulated by the IR demodulation circuit 13 included in the set-top box 10 and transmitted to the main controller 14. Accordingly, the main controller 14 may perform a control corresponding to the operation of the remote control, such as controlling a change of a modulated channel of the RF modulator 11.

On the other hand, the TV link 40 receives an IR signal from the remote control, modulates an amplitude of the IR signal into a carrier frequency such as 7.2 MHz included in a frequency range from 7 to 8 MHz, and transmits a remote control signal to the IR demodulation circuit 13 of the set-top box 10. In this case, when a level of the remote control signal is high, a harmonic of 7.2 MHz may interfere with a TV signal. Accordingly, the remote control signal may have a low level as possible and the IR demodulation circuit 13 has to more accurately detect a weak remote control signal with a low level such as 0.380 V regardless of a temperature change.

FIG. 2 is a configuration diagram illustrating a conventional IR demodulation circuit.

Referring to FIG. 2, the IR demodulation circuit includes a transistor Q1 having a base connected to an input terminal In via an input coupling capacitor Cin, a bias resistor R1 connected between the base and an operating voltage Vcc and a bias resistor R3 connected between a collector of the transistor Q1 and the operating voltage Vcc, and a bias resistor R2 connected between the base and a ground and a bias resistor R4 connected between an emitter of the transistor Q1 and the ground. An output terminal Out is connected to the collector of the transistor Q1 via an output coupling capacitor Cout.

Considering operations of the IR demodulation circuit as described above, as shown in FIG. 3, a remote control signal inputted via the input terminal In includes control information and the transistor Q1 is turned on and outputs a low level in a section in which the remote control signal has a high level and is turned off and outputs a high level in a section in which the remote control signal has a low level, thereby demodulating the remote control signal into a pulse signal including a high level and a low level.

On the other hand, since the conventional IR demodulation circuit has a transistor whose operating characteristics varies with a temperature change, an operating range in which a remote control signal with a relatively low level cannot normally be detected as described above.

This will be described referring to FIG. 3.

FIG. 3A is a time chart illustrating a main voltage waveform of the IR demodulation circuit of FIG. 2 when a base-emitter voltage Vbe is set as 0.5 and a turn-on voltage Von of a transistor Q1 is 0.65 Von at a temperature of 25° C. and is set as 0.4 and a turn-on voltage Von of the transistor Q1 is 0.45 V at a temperature of 125° C., respectively.

Referring to FIG. 3A, when a temperature of the transistor Q1 is 25° C., since the base-emitter voltage Vbe is 0.5 V, the turn-on voltage Von is 0.65 V, and an input signal Vin of 0.380 V is inputted while being coupled with the base-emitter voltage Vbe of 0.5 V, a maximum base voltage (Vbe+Vin/2) is 0.69 V when the input signal Vin is coupled with the base-emitter voltage Vbe. Accordingly, the transistor Q1 is turned on when the maximum base voltage (Vbe+Vin/2) of 0.69 V is higher than the turn-on voltage Von of 0.65 V and is turned off since the base voltage (Vbe=0.5 V, Vin=0) is lower than the turn-on voltage Von of 0.65 V when there is no input signal. According to the operations of the transistor Q1, an output voltage Vout is outputted in the form of a pulse signal with a low level and high level.

Referring to FIG. 3A, when the temperature of the transistor Q1 is 125° C., since the base-emitter voltage Vbe is 0.5 V, the turn-on voltage Von is 0.45 V (0.65−(2 mV/Δ1° C.)), and the input signal Vin of 0.380 V is inputted while being coupled with the base-emitter voltage Vbe of 0.5 V, a maximum base voltage (Vbe+Vin/2) is 0.69 V when the input signal Vin is coupled with the base-emitter voltage Vbe. Accordingly, the transistor Q1 is turned on when the maximum base voltage (Vbe+Vin/2) of 0.69 V is higher than the turn-on voltage Von and is turned on since the base voltage (Vbe=0.5 V,Vin=0) is higher than the turn-on voltage of 0.45 when there is no input signal. In this case, since the transistor Q1 is continuously turned on regardless of whether there is an input signal, the output voltage Vout continuously has a low level and it is impossible to normally detect a remote control signal.

To solve the problem described above, in the case where the base-emitter voltage Vbe of the transistor Q1 is set as 0.4 V will be described referring to FIG. 3B.

Referring to FIG. 3B, when a temperature of the transistor Q1 is 25° C., since the base-emitter voltage Vbe is 0.4 V, the turn-on voltage Von is 0.65 V, and an input signal Vin of 0.380 V is inputted while being coupled with the base-emitter voltage Vbe of 0.4 V, a maximum base voltage (Vbe+Vin/2) is 0.59 V when the input signal Vin is coupled with the base-emitter voltage Vbe. Accordingly, the transistor Q1 is turned off when the maximum base voltage (Vbe+Vin/2) of 0.59 V is lower than the turn-on voltage Von of 0.65 V and is turned off since the base voltage (Vbe=0.4 V, Vin=0) is lower than the turn-on voltage Von of 0.65 V when there is no input signal. In this case, since the transistor Q1 is continuously turned off regardless of whether there is an input signal, the output voltage Vout continuously has a high level and it is impossible to normally detect a remote control signal.

Referring to FIG. 3B, when the temperature of the transistor Q1 is 125° C., since the base-emitter voltage Vbe is 0.4 V, the turn-on voltage Von is 0.45 V (0.65−(2 mV/Δ1° C.)), and the input signal Vin of 0.380 V is inputted while being coupled with the base-emitter voltage Vbe of 0.4 V, a maximum base voltage (Vbe+Vin/2) is 0.59 V when the input signal Vin is coupled with the base-emitter voltage Vbe. Accordingly, the transistor Q1 is turned on since the maximum base voltage (Vbe+Vin/2) of 0.59 V is higher than the turn-on voltage Von of 0.4 V and is turned on since the base voltage (Vbe=0.4 V,Vin=0) is lower than the turn-on voltage of 0.45 when there is no input signal. According to the operations of the transistor Q1, the output voltage Vout is outputted in the form of a pulse signal with a low level and high level.

SUMMARY OF THE INVENTION

An aspect of the present invention provides a TV link infrared (IR) demodulation circuit in a set-top box connected to a plurality of TVs, the TV link IR demodulation circuit improving control sensitivity for remote-controlling TVs connected to one set-top box for each multi-room by more accurately detecting a weak signal from a TV link to remotely control a TV.

According to an aspect of the present invention, there is provided a television (TV) link infrared (IR) demodulation circuit including: a reference voltage setting unit setting a first reference voltage and a second reference voltage, different from each other; and a differential amplifier differentially amplifying the first reference voltage received via a first input terminal and a voltage obtained by coupling an input signal with the second reference voltage via a second input terminal and demodulating a remote control signal received via the second input terminal into a pulse signal.

The TV link IR circuit may further include an output buffer circuit part outputting the pulse signal from the differential amplifier.

The first reference voltage may be set to be higher than the second reference voltage and to be lower than a sum voltage of the second reference voltage and a maximum positive voltage of the remote control signal.

The differential amplifier may include: a first transistor having a first terminal connected to the first reference voltage, a second terminal connected to an operating voltage, and a third terminal connected to a ground via a resistor; and a second transistor having a first terminal connected to the second reference voltage to receive the remote control signal, a second terminal connected to the operating voltage via the resistor, and a third terminal connected to the third terminal of the first transistor.

The first transistor may be a negative-positive-negative (NPN) transistor having a base, a collector, and an emitter, corresponding to the first terminal, second terminal, and third terminal, respectively, and the second transistor may be an NPN transistor having a base, a collector, and an emitter, corresponding to the first terminal, second terminal, and third terminal, respectively.

The output butter circuit part may include: a third transistor having a first terminal connected to the collector of the second transistor, a second terminal, and a third transistor connected to the operating voltage; and a fourth transistor having a first terminal connected to the second terminal of the third transistor, a second terminal connected to the operating voltage and an output terminal, and a third terminal connected to the ground.

The third transistor may be a positive-negative-positive transistor having a base, a collector, and an emitter, corresponding to the first terminal, second terminal, and third terminal, and the fourth transistor may be an NPN transistor having a base, a collector, and an emitter, corresponding to the first terminal, second terminal, and third terminal.

The TV link IR demodulation circuit may further include a capacitor connected between an output terminal of the differential amplifier and the ground to remove noise included in an output voltage of the differential amplifier.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
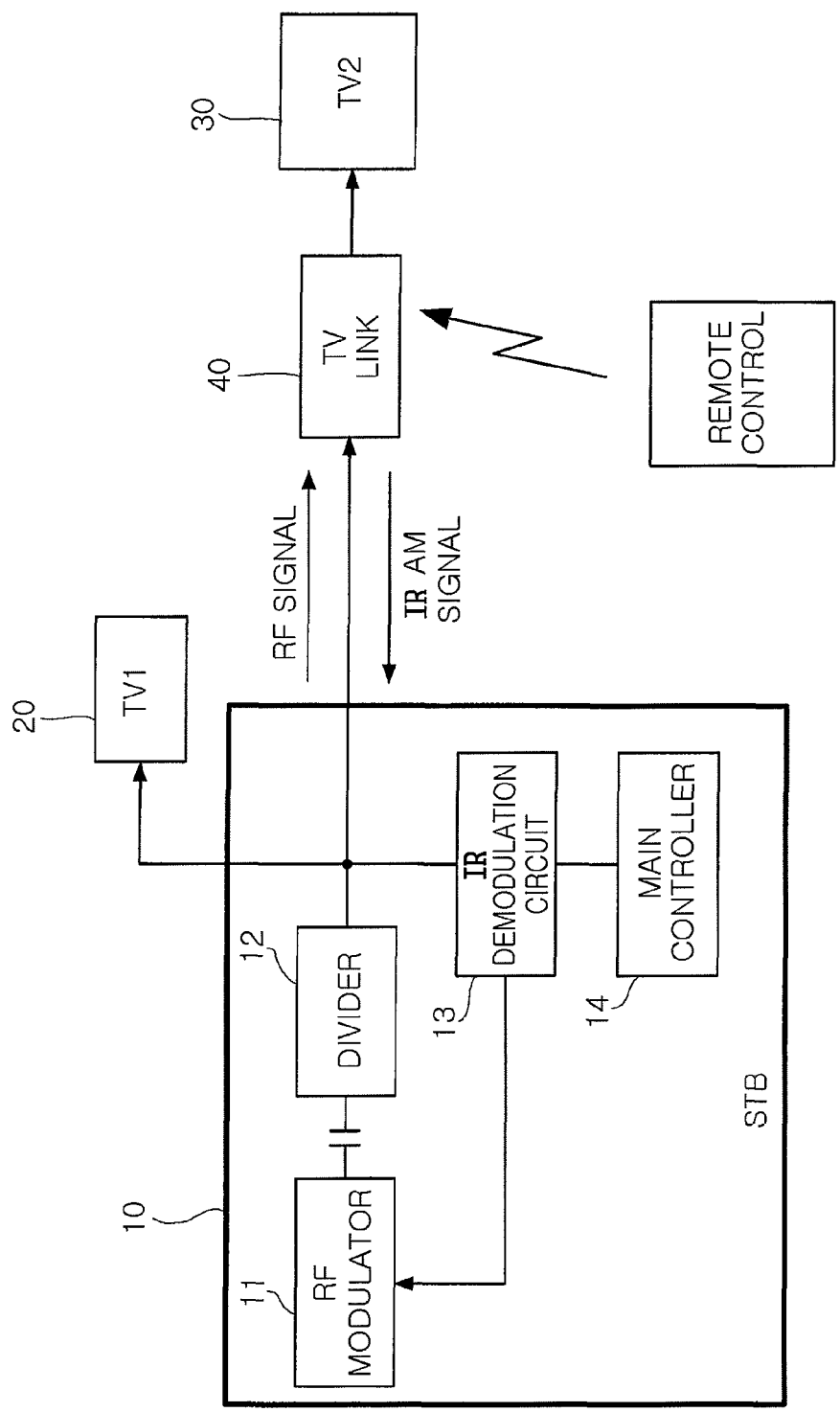
FIG. 1 is a functional diagram illustrating a conventional IR demodulation circuit in a set-top box.
Figure 2:
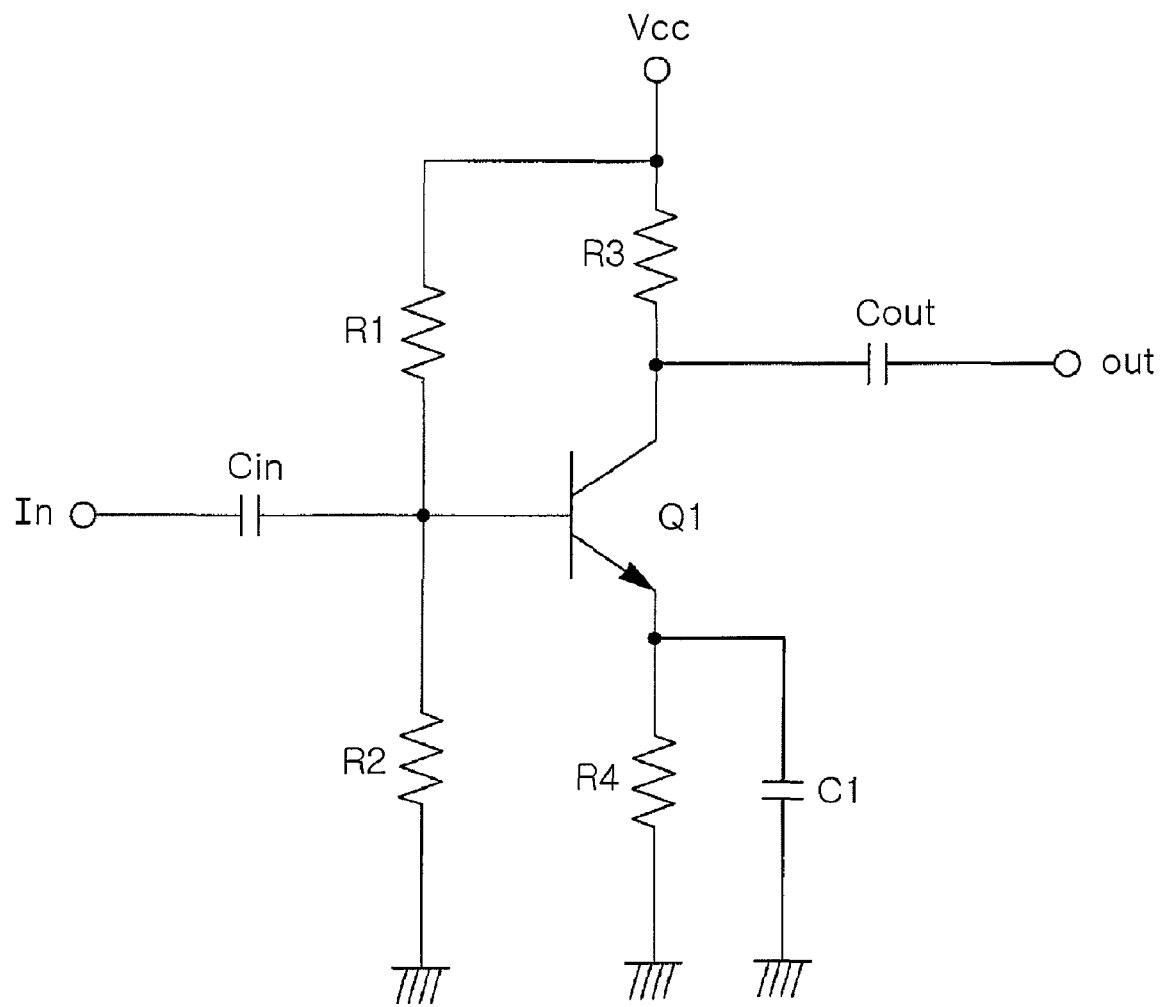
FIG. 2 is a configuration diagram illustrating a conventional IR demodulation circuit.
Figure 3A:
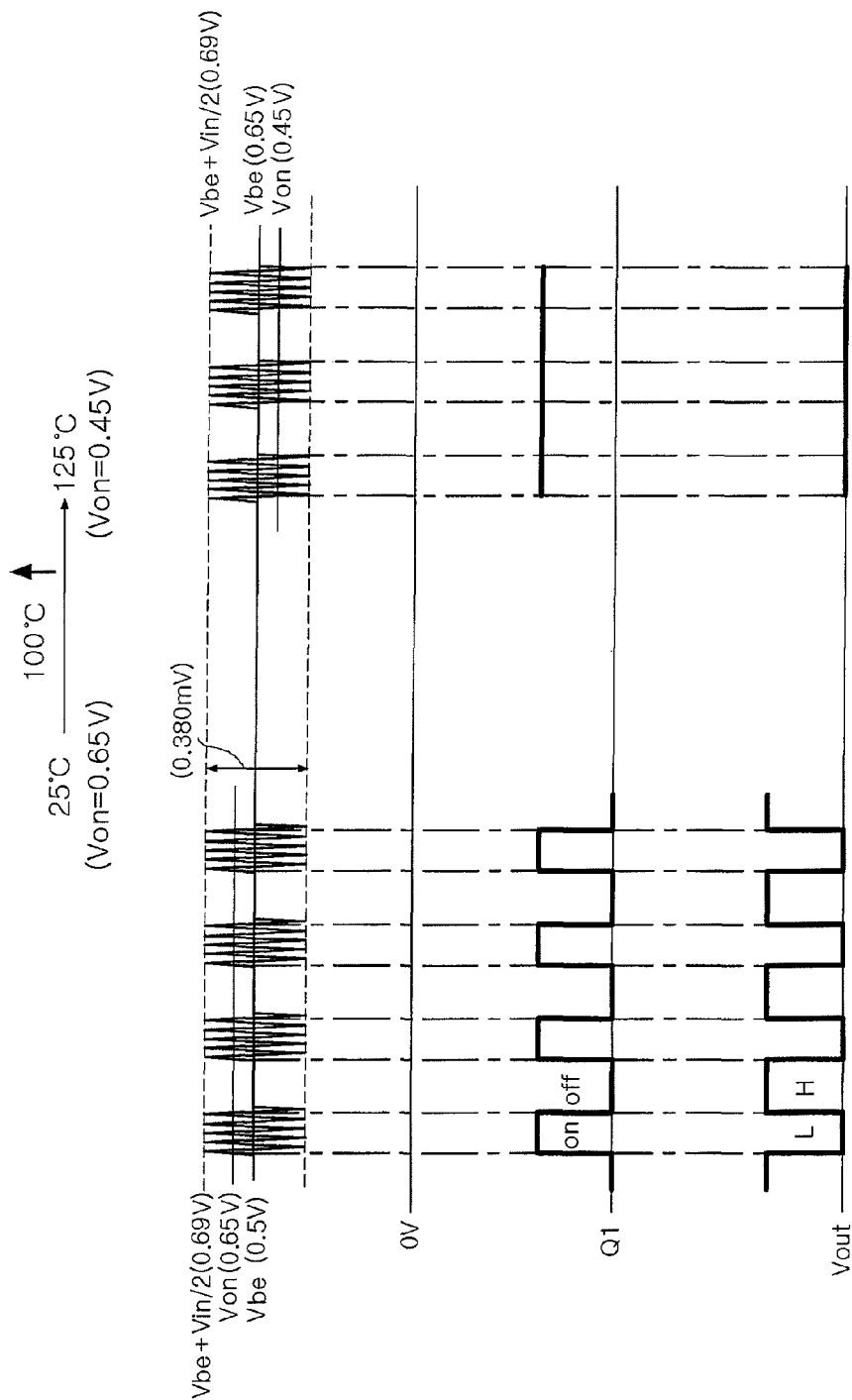
FIG. 3A is a time chart illustrating a main voltage waveform of the IR demodulation circuit of FIG. 2 when a base-emitter voltage is set as 0.5.
Figure 3B:
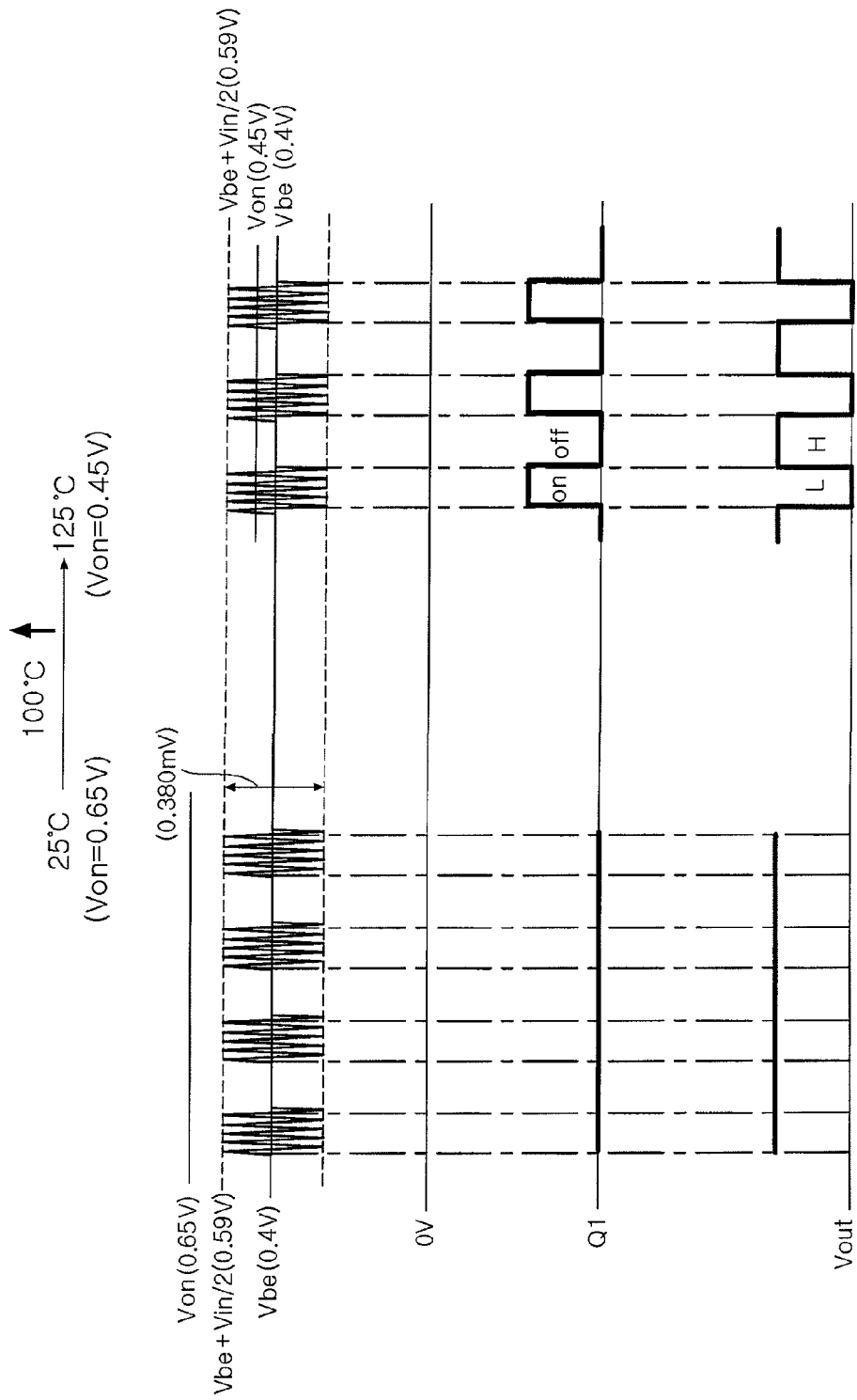
FIG. 3B is a time chart illustrating a main voltage waveform of the IR demodulation circuit of FIG. 2 when a base-emitter voltage is set as 0.4.

Hereinafter, the present invention will be described in detail by explaining preferred embodiments of the invention with reference to the attached drawings. Like reference numerals in the drawings denote like elements.

Figure 4:
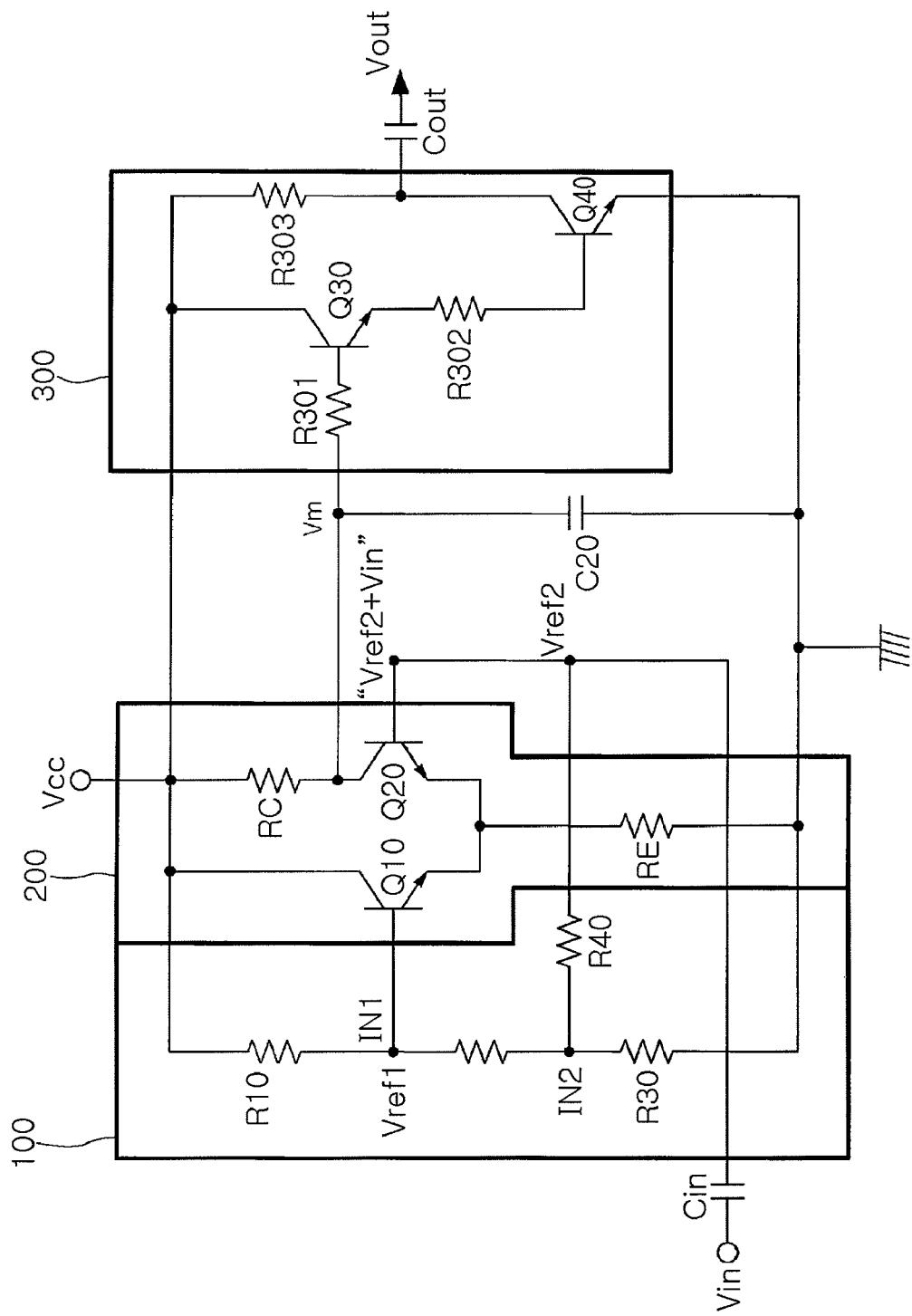
FIG. 4 is a configuration diagram illustrating an IR demodulation circuit according to an exemplary embodiment of the present invention.

FIG. 4 is a configuration diagram illustrating an infrared (IR) demodulation circuit according to an exemplary embodiment of the present invention.

Referring to FIG. 4, the IR demodulation circuit includes a reference voltage setting unit 100 setting a first reference voltage Vref1 and a second reference voltage Vref2, different from each other and a differential amplifier 200 differentially amplifying the first reference voltage Vref 1 received via a first input terminal IN1 and the second reference voltage Vref2 via a second input terminal IN2 and demodulating a remote control signal received via the second input terminal IN2 into a pulse signal.

Also, the TV link IR demodulation circuit may include an output buffer circuit part 300 outputting the pulse signal from the differential amplifier 100 to stably output a signal without being under the influence of load.

The IR demodulation circuit receives an input signal Vin via an input coupling capacitor Cin and outputs the pulse signal via an output coupling capacitor Cout.

In this case, the first reference voltage Vref1 may be determined to be higher than the second reference voltage Vref2 and to be lower than a sum voltage (Vref2+Vin/2) of the second reference voltage Vref2 and a maximum positive voltage of the remote control signal.

For example, the reference voltage setting unit 100 includes first, second, and third direct-current (DC) resistors R10, R20, and R30 dividing an operating voltage Vcc. In this case, the first input terminal IN1 between the first DC resistor R10 and the second DC resistor R20 may provide the first reference voltage Vref1 and the second input terminal IN2 between the second DC resistor R20 and the third DC resistor R30 may provide the second reference voltage Vref20 via a resistor R40.

For example, the differential amplifier 200 may include a negative-positive-negative (NPN) first transistor having a base connected to the first reference voltage Vref1, a collector connected to the operating voltage Vcc, and an emitter connected to a ground via a resistor RE and an NPN second transistor having a base connected to the second reference voltage Vref2 to receive the remote control signal, a collector connected to the operating voltage Vcc via a resistor RC, and an emitter connected to the emitter of the first transistor Q10.

For example, the output buffer circuit part 300 may include a positive-negative-positive (PNP) third transistor Q30 having a base connected to the collector of the second transistor Q20 via a resistor R301, a collector, and an emitter connected to the operating voltage Vcc via a resistor R303 and an NPN fourth transistor Q40 having a base connected to the collector of the third transistor Q30, a collector connected to the operating voltage Vcc and an output terminal Vout, and an emitter connected to the ground.

Also, the IR demodulation circuit may further include a capacitor C20 connected between the output terminal and the ground to reduce noise included in an output voltage Vm of the differential amplifier 200.

Figure 5:
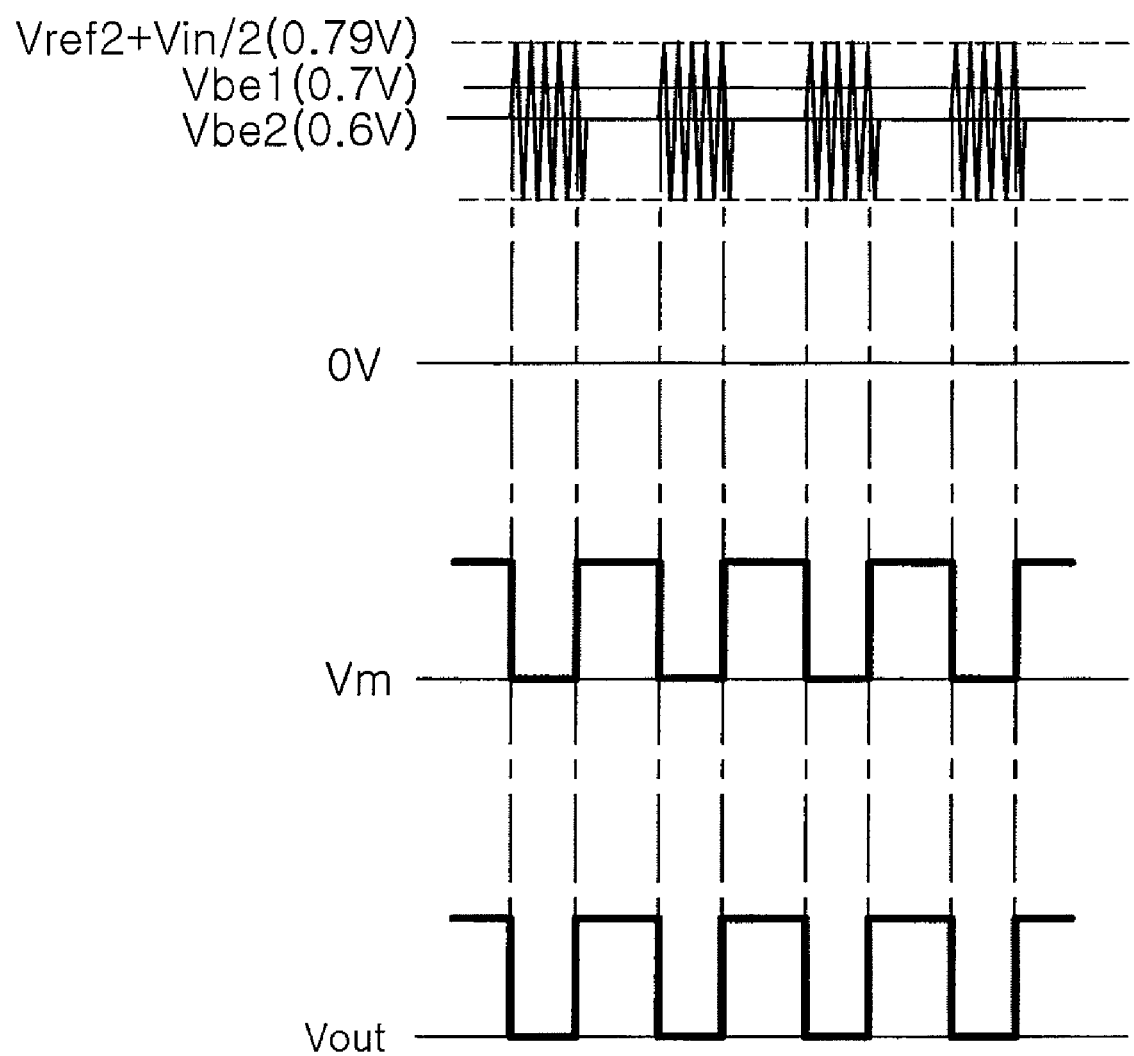
FIG. 5 is a time chart illustrating a main voltage waveform of the IR demodulation circuit of FIG. 4.

FIG. 5 is a time chart illustrating a main voltage waveform of the IR demodulation circuit of FIG. 4.

Referring to FIG. 5, the first reference voltage of the reference voltage setting unit 100 is designated as Vref1 and the second reference voltage of the reference voltage setting unit 100 is designated as Vref2. A voltage inputted via the second input terminal IN2 of the differential amplifier 200 is designated as "Vref2+Vin/2", and an output voltage of the differential amplifier 200 is designated as Vm, and an output voltage of the output buffer circuit part 300 is designated as Vout.

Operations and effects of the IR demodulation circuit will be described in detail with reference to the attached drawings.

Referring to FIG. 4, the reference voltage setting unit 100 sets and outputs the first reference voltage Vref1 and the second reference voltage Vref2 different from each other to the first input terminal IN1 and the second input terminal IN2 of the differential amplifier 200, respectively.

For example, when the reference voltage setting unit 100 includes the first, second, third DC resistors R10, R20, and R30 dividing the operating voltage Vcc, the first reference voltage Vref1 may be outputted from the first input terminal IN1 between the first DC resistor R10 and the second DC resistor R20 and the second reference voltage Vref2 may be outputted from the second input terminal IN2 between the second DC resistor R20 and the third DC resistor R30 via the resistor R40.

Also, the first reference voltage Vref1 may be set to be higher than the second reference voltage Vref2 and to be lower than a sum voltage Vref2+Vin/2 of the second reference voltage Vref2 and a maximum positive voltage of the remote control signal. For example, when the second reference voltage Vref2 is set as 0.7 V, the first reference voltage Vref1 may be set to be higher than the second reference voltage Vref2=0.7 V.

When the input signal Vin is 0.380 V, the first reference voltage Vref1 may be set to be lower than a sum voltage Vref2+Vin/2=0.890 V of the second reference voltage Vref2 and a maximum positive voltage +Vin/2=0.190 V of the remote control signal. The first reference voltage Vref1 satisfying this condition may be set to be in a voltage range from 0.8 V to 0.89 V, for example, 0.8 V.

The differential amplifier 200 differentially amplifies the first reference voltage Vref1 and a sum voltage obtained by coupling the second reference voltage Vref2 with the input signal Vin, via the first input terminal IN1 and the second input terminal IN2, respectively, and demodulates the remote control signal into a pulse signal.

For example, the differential amplifier 200 differentially amplifies the first reference voltage Vref1 inputted to the base of the first transistor Q10 and the sum voltage Vref2+Vin/2 obtained by coupling the second reference voltage Vref2 inputted to the base of the second transistor Q20 with the input signal.

That is, when the sum voltage Vref2+Vin/2 is higher than the first reference voltage Vref1, the first transistor Q10 is turned off, the second transistor Q20 is turned on, and the output voltage of the differential amplifier 200 has a low level.

On the other hand, when the sum voltage Vref2+Vin/2 is lower than the first reference voltage Vref1, the first transistor Q10 is turned on, the second transistor Q20 is turned off, and the output voltage Vm of the differential amplifier 200 has a high level.

As described above, the differential amplifier 200 demodulates the input signal Vin, whose amplitude is modulated into a carrier frequency of 7.2 MHz, inputted from the TV link, this is, the remote control signal into a pulse signal with a high level and a low level.

On the other hand, the output voltage of the differential amplifier 200 may be directly outputted to a main controller of a set-top box. However, to stably output a signal without being under the influence of load, the output voltage Vm may be outputted to the main controller via the output buffer circuit part 300.

In this case, the output buffer circuit part 300 may include the PNP third transistor Q30 and the NPN fourth transistor Q40.

In this case, when the output voltage Vm of the differential amplifier 200 has a high level, the third transistor Q30 and the fourth transistor Q40 are turned off and the operating voltage Vcc is directly outputted to the output terminal Vout. Accordingly, when the output voltage Vm of the differential amplifier 200 has a high level, the IR demodulation circuit outputs a pulse signal with a high level.

On the other hand, the output voltage Vm of the differential amplifier 200 has a low level, the third transistor Q30 and the fourth transistor Q40 are turned on, the operating voltage Vcc is connected to the ground, and a ground level is outputted to the output terminal Vout. Accordingly, when the output voltage Vm of the differential amplifier 200 has a low level, the IR demodulation circuit outputs a pulse signal with a low level.

Referring to FIG. 5, the IR demodulation circuit may always stably detect a remote control signal regardless of a temperature change.

In FIG. 5, a temperature of a transistor is one of 25° C. and 125° C., the input signal Vin is 0.380 V, amplitude modulated into 7.2 MHz, the first reference voltage Vref1 is set as 0.7 V, and the second reference voltage Vref2 is set as 0.6 V. In this case, since the input signal Vin is coupled with the second reference voltage Vref2 that is a DC voltage, a maximum voltage of the sum voltage Vref2+Vin/2 becomes 0.79 V.

Accordingly, since a difference voltage between the first reference voltage Vref1 and the sum voltage Vref2+Vin/2 is constant regardless of a temperature change, the differential amplifier 200 may accurately detect the remote control signal regardless of the temperature change.

This is, when the sum voltage Vref2+Vin/2=0.79 V is higher than the first reference voltage Vref1=0.7 V, the differential amplifier 200 outputs a pulse signal with a low level. When there is no input signal Vin and the sum voltage Vref2+0 V=0.6 V is lower than the first reference voltage Vref1=0.7 V, the differential amplifier 200 outputs a pulse signal with a high level.

As described above, since a weak remote control signal from a TV link may be more accurately detected by the IR demodulation circuit in a set-top box regardless of a temperature change, the IR demodulation circuit may be applied to a set-top box in which a level of a remote control signal is precisely regulated.

According to an exemplary embodiment of the present invention, there is provided a TV link IR demodulation circuit in a set-top box connected to a plurality of TVs, the TV link IR demodulation circuit improving control sensitivity for remote-controlling TVs connected to one set-top box for each multi-room by more accurately detecting a weak signal from a TV link to remotely control a TV.

While the present invention has been shown and described in connection with the exemplary embodiments, it will be apparent to those skilled in the art that modifications and variations can be made without departing from the spirit and scope of the invention as defined by the appended claims.

What is claimed is:

1. A television (TV) link infrared (IR) demodulation circuit comprising:
   a reference voltage setting unit configured to set a first reference voltage and a second reference voltage, different from each other; and
   a differential amplifier configured to differentially amplify the first reference voltage received via a first input terminal and a voltage obtained by coupling an input signal with the second reference voltage, via a second input terminal, and configured to demodulate a remote control signal received via the second input terminal into a pulse signal, wherein
   the differential amplifier comprises:
   a first transistor having a fist terminal connected to receive the first reference voltage, a second terminal connected to receive an operating voltage, and a third terminal connected to a ground via a first resistor; and
   a second transistor having a first terminal connected to receive the second reference voltage and to receive the remote control signal, a second terminal connected to receive the operating voltage via a second resistor, and a third terminal connected to the third terminal of the first transistor.

2. The TV link IR circuit of claim 1, further comprising an output buffer circuit part configured to output the pulse signal from the differential amplifier.

3. A television (TV) link infrared (IR) demodulation circuit comprising:
   a reference voltage setting unit configured to set a first reference voltage and a second reference voltage, different from each other;
   a differential amplifier configured to differentially amplify the first reference voltage received via a first input terminal and a voltage obtained by coupling an input signal with the second reference voltage, via a second input terminal, and configured to demodulate a remote control signal received via the second input terminal into a pulse signal; and
   an output buffer circuit part configured to output the pulse signal from the differential amplifier, wherein
   the first reference voltage is set to be higher than the second reference voltage and to be lower than a sum voltage of the second reference voltage and a maximum positive voltage of the remote control signal, and
   the differential amplifier comprises: a first transistor having a first terminal connected to receive the first reference voltage, a second terminal connected to receive an operating voltage, and a third terminal connected to a ground via a first resistor; and
   a second transistor having a first terminal connected to receive the second reference voltage and to receive the remote control signal, a second terminal connected to receive the operating voltage via a second resistor, and a third terminal connected to the third terminal of the first transistor.

4. The TV link IR demodulation circuit of claim 3, wherein
   the first transistor is a negative-positive-negative (NPN) transistor having a base, a collector, and an emitter, corresponding to the first terminal, second terminal, and third terminal, respectively, and
   the second transistor is an NPN transistor having a base, a collector, and an emitter, corresponding to the first terminal, second terminal, and third terminal, respectively.

5. The TV link IR demodulation IR demodulation circuit of claim 4, wherein the output butter circuit part comprises:
   a third transistor having a first terminal connected to the collector of the second transistor, a second terminal, and a third terminal connected to receive the operating voltage; and
   a fourth transistor having a first terminal connected to the second terminal of the third transistor, a second terminal connected to receive the operating voltage and an output terminal, and a third terminal connected to the ground.

6. The TV link IR demodulation circuit of claim 5, wherein
   the third transistor is a positive-negative-positive transistor having a base, a collector, and an emitter, corresponding to the first terminal, second terminal, and third terminal, respectively, and
   the fourth transistor is an NPN transistor having a base, a collector, and an emitter, corresponding to the first terminal, second terminal, and third terminal, respectively.

7. The TV link IR demodulation circuit of claim 6, further comprising a capacitor connected between an output terminal of the differential amplifier and the ground to remove noise included in an output voltage of the differential amplifier.

8. The TV link IR demodulation circuit of claim 1, wherein
   the first transistor is a negative-positive-negative (NPN) transistor having a base, a collector, and an emitter, corresponding to the first terminal, second terminal, and third terminal, respectively, and
   the second transistor is an NPN transistor having a base, a collector, and an emitter, corresponding to the first terminal, second terminal, and third terminal, respectively.

9. The TV link IR demodulation IR demodulation circuit of claim 2, wherein the output butter circuit part comprises:
   a third transistor having a first terminal connected to the collector of the second transistor, a second terminal, and a third terminal connected to receive the operating voltage; and
   a fourth transistor having a first terminal connected to the second terminal of the third transistor, a second terminal connected to receive the operating voltage and an output terminal, and a third terminal connected to the ground.

10. The TV link IR demodulation circuit of claim 9, wherein the third transistor is a positive-negative-positive transistor having a base, a collector, and an emitter, corresponding to the first terminal, second terminal, and third terminal, respectively, and the fourth transistor is an NPN transistor having a base, a collector, and an emitter, corresponding to the first terminal, second terminal, and third terminal, respectively.

11. The TV link IR demodulation circuit of claim 1, further comprising a capacitor connected between an output terminal of the differential amplifier and the ground to remove noise included in an output voltage of the differential amplifier.

* * * * *